UNITED STATES PATENT OFFICE.

CHARLES M. HALL, OF OBERLIN, OHIO.

PROCESS OF ELECTROLYZING FUSED SALTS OF ALUMINIUM.

SPECIFICATION forming part of Letters Patent No. 400,667, dated April 2, 1889.

Application filed September 21, 1888. Serial No. 286,034. (No specimens.)

*To all whom it may concern:*

Be it known that I, CHARLES M. HALL, a citizen of the United States, residing at Oberlin, in the county of Lorain and State of Ohio, have invented or discovered certain new and useful Improvements in the Manufacture of Aluminium by Electrolysis of its Fused Salts, of which improvements the following is a specification.

In applications Nos. 207,601, 226,206, 282,952, 282,953, 282,954, and 282,955, filed, respectively, July 9, 1886, February 2, 1887, and August 17, 1888, I have described and claimed certain processes for the solution of the oxide of aluminium in a fused bath composed of the fluoride of aluminium and the fluoride of metal more electro-positive than aluminium, and separating the aluminium from the solution by an electric current, aluminium being separated at the negative electrode and oxygen at the positive electrode. In order that the inventions included in the above-mentioned applications may be practically successful in operation, it is necessary that a continuity of operation should be attained. While the processes described in some of said applications can be carried on continuously, the solution and subsequent separation producing very little if any effect upon the bath during comparatively long periods, in others the baths become clogged in reducing pure aluminium, but are capable of continuous operation when employed in manufacture of aluminium alloys—as, for example, the baths described in the applications filed July 9, 1886, and February 2, 1887, and consisting of the fluorides of aluminium and sodium and the fluorides of aluminium and potassium, become clogged when the negative electrode is formed of carbon, as is necessary in reducing pure aluminium on account of the affinity of aluminium for other metals; but when the bath composed of the fluorides of sodium and aluminium is employed in the manufacture of aluminium alloys—*e. g.*, aluminium bronze, in which case the negative electrode is formed of the metal with which the aluminium is to be alloyed, *e. g.*, copper, when aluminium bronze is desired—no such deterioration of the bath occurs.

In the processes described in applications Nos. 282,954 and 282,955, wherein the bath is formed of the fluoride of aluminium and the fluoride of an alkaline earth metal, and the fluorides of aluminium, sodium, and calcium, and a small percentage of the chloride of calcium, the reduction of pure aluminium may be effected, the negative electrode being formed of carbon without an appreciable deterioration of the bath.

In carrying out the invention described herein advantage is taken of the hereinbefore-described capability of repeated use of the bath without material deterioration as regards its effectiveness in dissolving alumina, and subsequently parting with the constituent elements thereof under the action of an electric current.

In the manufacture of aluminium a bath for the solution of the alumina is formed by melting together in suitable proportions the following materials: Fluoride of calcium, two hundred and thirty-four parts; cryolite, the double fluoride, ($Na_6Al_2F_{12}$,) four hundred and twenty-one parts; the fluoride of aluminium, eight hundred and forty-five parts, by weight, and about three to four per cent., (more or less,) of a suitable chloride—*e. g.*, calcium chloride. Alumina is then added to this bath, preferably in sufficient quantities to form a saturated solution. A small excess of alumina does not have any injurious effect, as such excess will simply sink to the bottom of the bath and will be subsequently taken up thereby. Electrodes connected with a dynamo-electric machine or other suitable source of electric energy are then inserted in the bath, the negative electrode being formed of carbon when pure aluminium is desired. The positive electrode may be formed of carbon or other suitable material. By the action of the electric current aluminium is reduced at the negative electrode and oxygen is released at the positive electrode, which, when formed of carbon, is slowly consumed, and must therefore be renewed from time to time. As the aluminium is reduced, it is melted by the heat of the bath and sinks down to the bottom, and is removed from time to time in any suitable manner—as, for example, by dipping it up through the bath by a ladle lined and coated with carbon, or by providing the containing crucible with a suitable outlet at its bottom, through which the aluminium may be drawn off. As the alumina is reduced and decomposed into its constituent elements, a further charge is added to the bath, care being taken not to add so much as will fill up the bath, an excess otherwise doing no harm. In this manner the operation may be carried on continuously without change or renewal of the bath, except such additions as may be required to replace loss due to volatilization and other causes. As the chloride of calcium volatilizes more rapidly than the other ingredients, a more frequent renewal thereof is necessary to preserve the required percentage. The necessity of replenishing the chloride of calcium is indicated by a falling off of the electric current, due to an increased resistance in the bath, and also by the character of the gas given off at the positive electrode, carbonic-acid gas being evolved when a proper percentage of the chloride is present in the bath, while carbonic oxide indicates a low percentage of the chloride.

The solvent may be formed of the fluoride of aluminium and the fluoride of an alkaline earth metal, as barium, calcium, and strontium, the fluorides being mixed together in suitable proportions—as, for example, one hundred and sixty-nine parts of aluminium fluoride and seventy-eight parts of the fluoride of calcium. In reducing pure aluminium, which is of less specific gravity than the bath composed as above stated, and therefore rises to the surface of the bath when reduced and melted, the negative electrode must be separated from the positive electrode on account of the oxidizing atmosphere around the latter by a partition extending down from the cover of the crucible below the surface of the bath.

The baths, composed as hereinbefore described, can be employed continuously in the manufacture of aluminium alloys by substituting for the carbon negative electrode an electrode formed of the metal with which the aluminium is to be alloyed—as, for example, if an aluminium bronze is desired, the negative electrode is formed of copper, or if an alloy of aluminium and iron is desired the negative electrode is formed of iron. As the aluminium, which has a great affinity for other metals, is reduced and melted at the negative electrode, it collects thereon and takes up a certain portion thereof, thus forming the alloy.

When employing the fluorides of aluminium and an alkaline earth metal in the manufacture of alloys of aluminium and a heavy metal, as copper or iron, the specific gravity of the resulting product is greater than that of the bath, and will therefore sink to the bottom of the bath; hence the partition for separating the electrodes, as hereinbefore mentioned, may be omitted.

In the manufacture of aluminium alloys the bath or solution may be formed of the fluorides of aluminium and an alkaline metal, as sodium, as no material deterioration of the bath occurs when a metallic negative electrode is employed; and hence the operation of reduction can be carried on continuously without any changes in the bath, except as regards additions to replace loss from evaporation or other causes.

In carrying out the processes hereinbefore mentioned the containing-crucible is formed of metal and lined with carbon, as fully described in the applications above referred to. An electric current having an electro-motive force of from four to eight volts is preferred in reducing the aluminium.

In the above-described method as the aluminium is reduced a fresh supply of alumina may be added in greater or less quantities from time to time or may be added continuously.

I claim herein as my invention—

1. As an improvement in the art of manufacturing aluminium or alloys thereof, the herein-described continuous method, consisting in dissolving alumina in a fused bath composed of the fluoride of aluminium and the fluoride of a metal more electro-positive than aluminium, passing an electric current through the fused solution by means of suitable electrodes arranged therein, thereby separating the alumina into its constituent elements, adding from time to time or continuously a fresh supply of alumina to the bath, and removing the aluminium, substantially as set forth.

2. As an improvement in the art of manufacturing aluminium, the herein-described continuous method, consisting in dissolving alumina in a fused bath composed of the fluorides of aluminium, sodium, and calcium, and the chloride of calcium, passing an electric current through the fused solution by means of suitable electrodes arranged therein, thereby separating the alumina into its constituent elements, adding from time to time or continuously a fresh supply of alumina to the bath, and removing the aluminium, substantially as set forth.

In testimony whereof I have hereunto set my hand.

CHARLES M. HALL.

Witnesses:
 DARWIN S. WOLCOTT,
 R. H. WHITTLESEY.